United States Patent
Charnitski (10) Patent No.: US 7,213,883 B2
(45) Date of Patent: May 8, 2007

(54) HEAD REST

(76) Inventor: Richard Charnitski, 25601 Adriana St., Mission Viejo, CA (US) 92691

( * ) Notice: Subject to any disclaimer, the term of this patent is extended or adjusted under 35 U.S.C. 154(b) by 0 days.

(21) Appl. No.: 11/138,983

(22) Filed: May 26, 2005

(65) Prior Publication Data

US 2006/0267392 A1 Nov. 30, 2006

(51) Int. Cl.
*A47C 7/38* (2006.01)
(52) U.S. Cl. .................. 297/391; 297/397; 297/452.41
(58) Field of Classification Search ................ 297/391, 297/397, 452.41
See application file for complete search history.

(56) References Cited

U.S. PATENT DOCUMENTS

| | | | |
|---|---|---|---|
| 4,991,222 A * | 2/1991 | Nixdorf | 297/391 X |
| 5,064,245 A * | 11/1991 | Stephens | 297/397 X |
| 5,330,255 A * | 7/1994 | Stawicki | 297/391 |
| 6,860,563 B1 * | 3/2005 | Semsch et al. | 297/397 |
| 2002/0113482 A1 * | 8/2002 | Clegg | 297/391 X |

* cited by examiner

*Primary Examiner*—Anthony D. Barfield
(74) *Attorney, Agent, or Firm*—Stetina Brunda Garred & Brucker

(57) ABSTRACT

A head rest for vertically supporting a person's head while in a seated position wherein the person's head defines left and right sides is provided. The head rest may comprise a first inflatable compartment sized and configured to receive the left side of the person's head. The head rest may also comprise a second inflatable compartment connected to the first inflatable compartment. The second inflatable compartment may be sized and configured to receive the right side of the person's head and have a mirror configuration of the first inflatable compartment. The first and second inflatable compartments may be isolated from each other such that the first and second inflatable compartments are independently inflatable. The head rest may also comprise a connecting strap attached to the first and second inflatable compartments for connecting the first inflatable compartment to the second inflatable compartment. Also, the head rest may comprise first and second valves attached to first and second inflatable compartments, respectively, for filling and removing a filler material from the first and second inflatable compartments.

11 Claims, 6 Drawing Sheets

HEAD REST

BACKGROUND

The present invention relates to a head rest.

Travelers often attempt to sleep while seated in slightly angled high back seats normally found in airplanes, trains, buses, and automobiles. Unfortunately, the traveler's head may tilt to the left or right or forward due to gravitational forces and movement of the airplane, train, bus or automobile while trying to sleep. Travelers that sleep with their heads tilted develop stiff, cramped or sore muscles, and may experience headaches from the resulting muscle tension. Interrupted sleep in such situations is common. Accordingly, there is a need in the art to alleviate such problems.

SUMMARY

In an embodiment, a head rest is provided. The head rest may be for the purpose of vertically supporting a person's head while in a seated position wherein the person's head defines left and right sides is provided. The head rest may comprise a first inflatable compartment sized and configured to receive the left side of the person's head. The head rest may also comprise a second inflatable compartment sized and configured to receive the right side of the person's head. The second inflatable compartment may have a mirror configuration compared to the first inflatable compartment and be connected to the first inflatable compartment. The first and second inflatable compartments may be isolated from each other such that the first and second inflatable compartments are independently inflatable. The head rest may also comprise a connecting strap attached to the first and second inflatable compartments for connecting the first inflatable compartment to the second inflatable compartment. Also, the head rest may comprise first and second valves attached to first and second inflatable compartments, respectively, for filling and removing a filler material from the first and second inflatable compartments.

In an aspect of the head rest, the first and second inflatable compartments may each have ear recesses for receiving ears of the person such that the first and second inflatable compartments support sides of the person's head and do not contact the person's ears or only minimally contact the person's ears.

In another aspect of the head rest, the connecting strap may be inflatable via a third valve attached to the connecting strap.

In another aspect of the head rest, inner portions of the first and second inflatable compartments may each have a vertical straight seal line to form a straight channel.

In another aspect of the head rest, inner portions of the first and second inflatable compartments may each have a curved seal line to form a channel having a bowed configuration.

In another aspect of the head rest, the connecting strap may comprise a first connector attached to the first inflatable compartment. A top side of the first connector may have a set of loops attached thereto. The connecting strap may also comprise a second connector attached to the second inflatable compartment. An underside of the second connector may have a set of hooks attached thereto. The set of loops may be removeably securable to the set of hooks for adjusting the distance between the first and second inflatable compartments.

In another aspect, the first and second inflatable compartments may each have a banana shaped configuration.

In another aspect of the head rest, the connecting strap may comprise an upper cord connected to tops of the first and second inflatable compartments. The connecting strap may also comprise a lower cord connected to bottoms of the first and second inflatable compartments. The upper cord may be adjustable in length to adjust the distance between the first and second inflatable compartments.

In another aspect of the head rest, the first and second inflatable compartments may each have a semi circular configuration.

In another aspect of the head rest, the connecting strap may be connected to the first and second inflatable compartments at the inner radius thereof.

In another aspect of the head rest, an upper periphery portion of the head rest may be sized and configured to receive a lower portion of the person's head, and a lower periphery of the head rest may have a sloping configuration so as to be sized and configured to receive person's upper shoulders.

In another aspect of the head rest, vertical portions of the first and second inflatable compartments may curve inward such that tops of the vertical portions support rear upper sides of the person's head.

In another embodiment of the head rest, a head rest for vertically supporting a person's head while in a seated position is provided. The head rest may comprise an inflatable compartment having a U shaped configuration sized and configured to receive the person's head. The inflatable compartment may define an inner periphery. The head rest may also comprise a connecting strap attached to the inflatable compartment at the inner periphery for maintaining a distance between the first and second inflatable compartments. Optionally, a seal line may be formed at a bottom of the head rest following the inner and outer peripheries of the head rest.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The term inflate or inflatable is used herein to mean to be able to fill or swell with and remove a filler material. By way of example and not limitation, the filler material may be cotton, beads, gel, foam, fluid such as liquids or gases, air, carbon dioxide, or other soft plush material. The preferred embodiment uses gas tight compartments inflated with gases, and while the following disclosure uses that embodiment the disclosures herein are not so limited.

Referring now to FIGS. 1–6, a head rest 10a is illustrated with first and second compartments 12a, 14a which are sealed to prevent leakage of gas and isolated from each other such that they may be independently inflatable with gas with respect to each other. The first inflatable compartment 12a and the second inflatable compartment 14a may each have a bulbous configuration to support the person's head 16 in the upright position. In particular, the first and second inflatable compartments 12a, 14a may apply stabilizing forces to the left and right sides 18, 20 of the person's head 16 to maintain the person's head 16 in the upright position (see FIG. 1). The lower portion of the compartments 12a, 14a may also support the user's neck and/or support the lower part of the person's head or skull, and provide means for such support.

Figure 1:
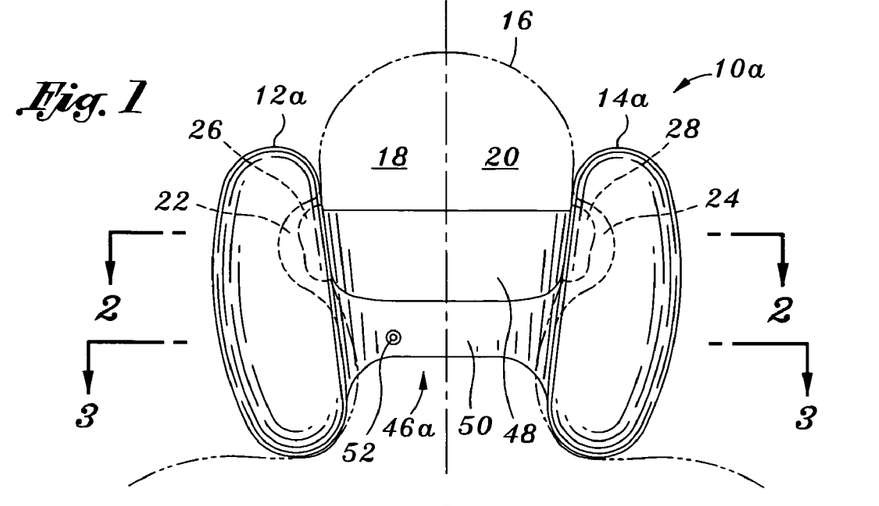
FIG. 1 is a rear view of a first embodiment of a head rest illustrating first and second separately inflatable compartments with ear recesses.
Figure 2:
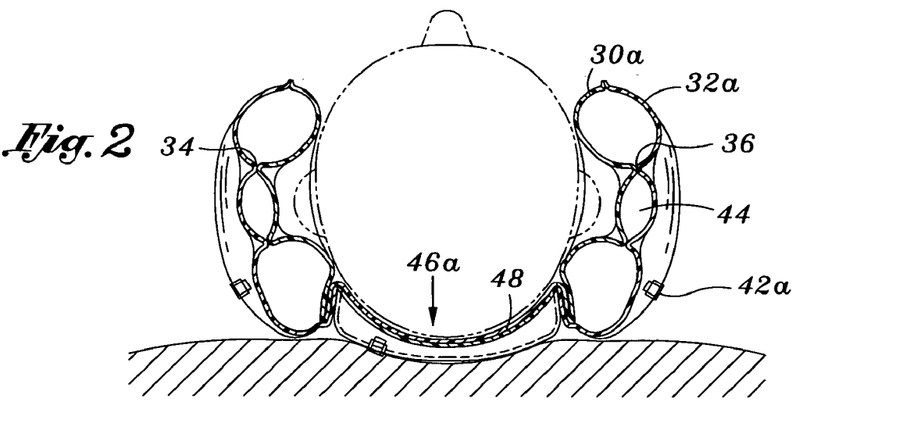
FIG. 2 is a top cross sectional view of FIG. 1 illustrating the structure of the ear recesses.

Ear recesses 22, 24 may be formed in the first and second inflatable compartments 12a, 14a, as shown in FIGS. 1 and 2. They 22, 24 may be formed on the inner sides of the first and second inflatable compartments 12a, 14a such that the ear recesses 22, 24 receive the person's left and right ears 26, 28, respectively, when the head rest 10a is inflated and positioned adjacent and behind the person's head 16, as shown in FIGS. 1 and 2. The ear recesses 22, 24 may be sized, configured and positioned to receive the left and right ears 26, 28 of the person such that the first and second inflatable compartments 12a, 14a do not press against the person's ears 26, 28 to support the person's head 16, rather, the first and second inflatable compartments 12a, 14a press against the sides of the person's head 16 to support the person's head 16 in a vertical position. As shown in FIGS. 1 and 2, the periphery of the ear recesses 22, 24 may contact the sides of the person's head 16 about the periphery of the left and right ears 26, 28, and the left and right ears 26, 28 are received into the ear recesses 22, 24.

The ear recesses 22, 24 may be formed by sealing a front layer 30a (see FIGS. 2 and 4) and a back layer 32a (see FIG. 2) of each of the first and second inflatable compartments 12a, 14a with seals 34, 36. Preferably, but optionally the seals comprise one circular, oval or like seal 34, 36 (see FIG. 4) having a partial opening 38, 40 of reduced size to allow filler material to pass therethrough when the first and second inflatable compartments 12a, 14a are being inflated or deflated. The seal joint is preferably fluid tight when the compartments are inflated with fluids, but could be sewn or otherwise joined of other materials are used. A valve 42a (see FIG. 2) may be opened and filler material may be filled into the first and second inflatable compartments 12a, 14a independently of each other, and may be used to adjust the size or amount of inflation of the compartments that are in communication with each other. The valve 42a is preferably a fluid or gas check valve such that the first and second inflatable compartments 12a, 14a must be squeezed to deflate the first and second inflatable compartments 12a, 14a. By way of example and not limitation, the valve 42a may be a pinch pull valve commonly seen in swimming pool floatation devices. As the filler material is filled into the first and second inflatable compartment 12a, 14a, the cavity 44 (see FIG. 2) within the circular, oval or the like seals 34, 36 may also be inflated with filler material. It is also contemplated that the entire area of the circular, oval, or the like seals 34, 36 may be sealed such that such area is flat (i.e., not filled with filler material) when the first and second inflatable compartments 12a, 14a are inflated.

Figure 3:
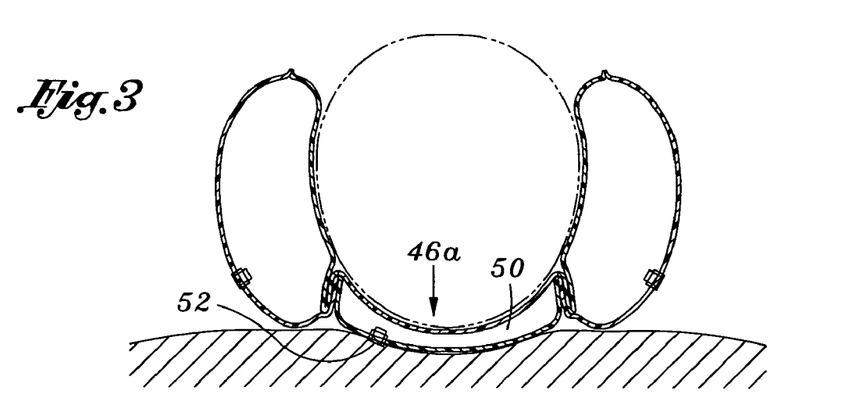
FIG. 3 is a top cross sectional view of FIG. 1 illustrating an inflatable connecting strap.

The first and second inflatable compartments 12a, 14a may be joined to each other via an optionally inflatable connecting strap 46a (see FIGS. 1–6) which forms a third inflatable compartment providing means for supporting a person's neck and/or lower head. The connecting strap 46a may have a top portion 48 (see FIGS. 1 and 2) and a bottom portion 50 (see FIGS. 1 and 3). One of the top portion 48 or bottom portion 50 could be omitted, but both are preferably used, the top portion 48 to engage the back of a person's head, and the bottom portion to engage and support the person's neck. The connecting strap 46a may be connected to one or the other of compartments 12a, 14a, or alternatively it can be isolated from the first and second inflatable compartments 12a, 14a such that inflation of either the first or second inflatable compartments 12a, 14a does not inflate the connecting strap 46a. The connecting strap 46a may be inflated via the valve 52 (see FIGS. 1, 3 and 6). It is also contemplated that the connecting strap 46a may be in communication with either the first or second inflatable compartments 12a, 14a such that inflation of the first or second inflatable compartments 12a, 14a will inflate the connecting strap 46a. As shown in FIGS. 1 and 2, the top portion 48 of the connecting strap may be flat and non-inflatable. Also, as shown in FIGS. 1 and 3, the bottom portion 50 of the connecting strap may be inflatable.

The head rest 10a may be fabricated by sealing two sheets (i.e., first sheet 53 and second sheet 55; see FIG. 4) of sealable material together and cutting out the outer periphery of the head rest silhouette. The two sheets may be heat sealable material sealed via heating methods and non-heating methods such as ultrasonic sealing, gluing, adhering and the like. The exterior of the sheets 53, 55 may be coated with suede or velour, flocked, coated PVC, moisture absorbent material, and/or has any soft surface such that the head rest 10a is comfortable when in contact with the person's skin. The first sheet 53 and the second sheet 55 may form the front layer 30a and the back layer 32a, respectively, of the head rest 10a.

Either sheet may have formed therein valves for inflating the compartments. Preferably, but optionally, there are two valves 42*a* and one valve 52 formed in the second sheet and positioned at about the positions shown in FIG. 4. The first sheet 53 may then be stacked on top of the second sheet 55. The first and second sheets 53, 55 may be sealed together with the patterned lines shown in FIG. 4. This forms the first and second inflatable compartments 12*a*, 14*a*, and the connecting strap 46*a* with a non-inflatable top portion 48 and an optionally inflatable bottom portion 50. The present and later descriptions refer to sealing sufficient to form fluid tight joints. If the compartments need not be fluid tight to restrain the filler material, e.g., if they are filled with beads, then sewing, or other forms of joinder can be used in the present embodiment, and in the later described embodiments.

Figure 4:
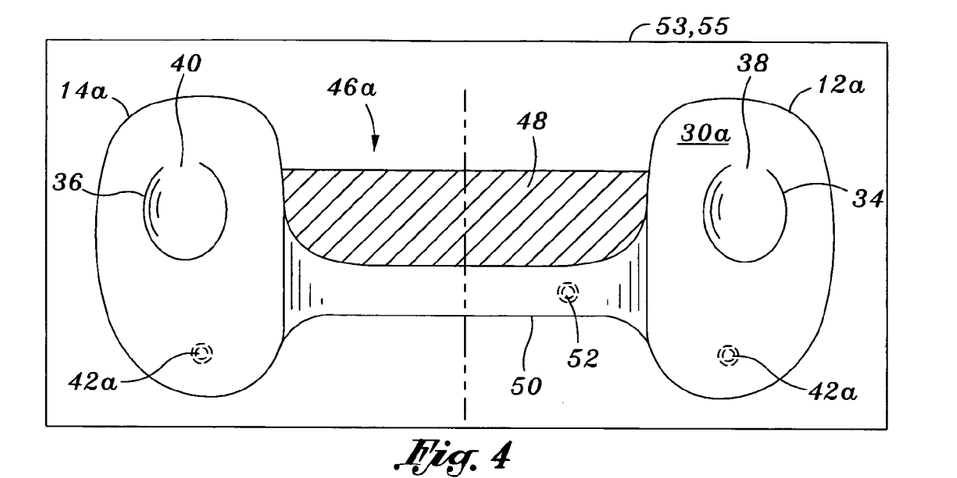
FIG. 4 is a front view of a front layer of the head rest shown in FIG. 1 before being folded and glued.

The ear recesses 22 and 24 may be formed by sealing the first and second sheets 53, 55 with an oval configuration shown by seal lines 34 and 36 at the first and second inflatable compartments 12*a*, 14*a* shown in FIG. 4. The oval configured seals 34, 36 may have openings 38, 40 to allow air or filler material to fill the cavity 44 (see FIG. 2) within such oval configured seal 34, 36.

Figure 5:
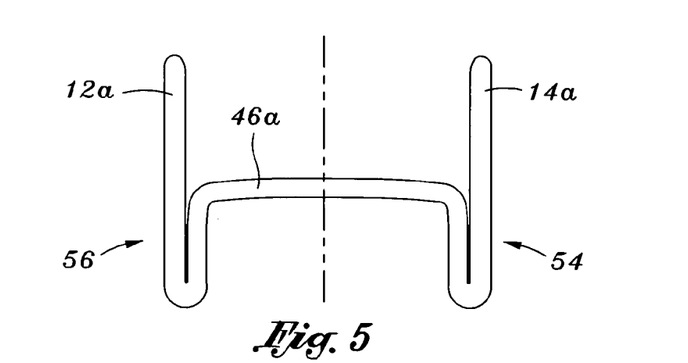
FIG. 5 is a top view of the head rest after being folded and glued.
Figure 6:
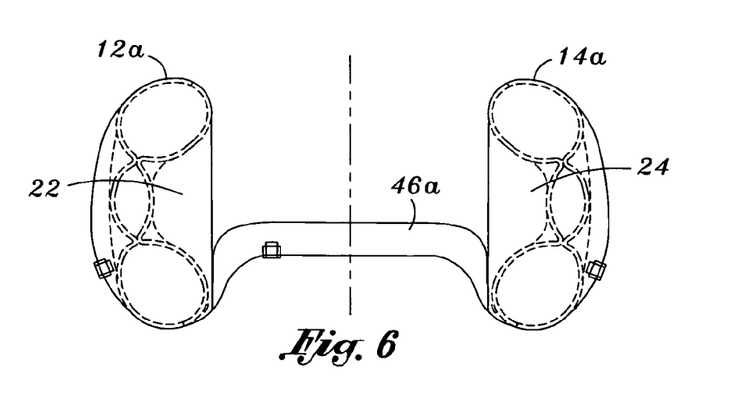
FIG. 6 is a top view of the head rest when inflated.

The first and second sheets 53, 55 may be cut to size in any desired configuration, preferably the configuration shown in FIG. 4. In particular, the first and second sheets may be cut about the periphery of the first and second inflatable compartments 12*a*, 14*a* as well as the connecting strap 46*a*. Thereafter, the head rest 10*a* may be folded and glued, sealed or otherwise joined at the junctions 54, 56 of first and second inflatable compartments 12*a*, 14*a* and the connecting strap 46*a*, as shown in FIG. 5.

The head rest 10*a* provides for first and second inflatable compartments 12*a*, 14*a* which are positionable adjacent to the person's head 16. The first and second inflatable compartments 12*a*, 14*a* have formed therein ear recesses 22, 24 to receive the person's ears 26, 28 such that the first and second inflatable compartments 12*a*, 14*a* press against the side of the person's head 16 to support the person's head 16, instead of pressing against the person's ears 26, 28. It is also contemplated that the ear recesses 22, 24 are not formed in the first and second inflatable compartments 12*a*, 14*a* such that the head rest may more easily be positioned at any position along the person's head.

Figure 7:
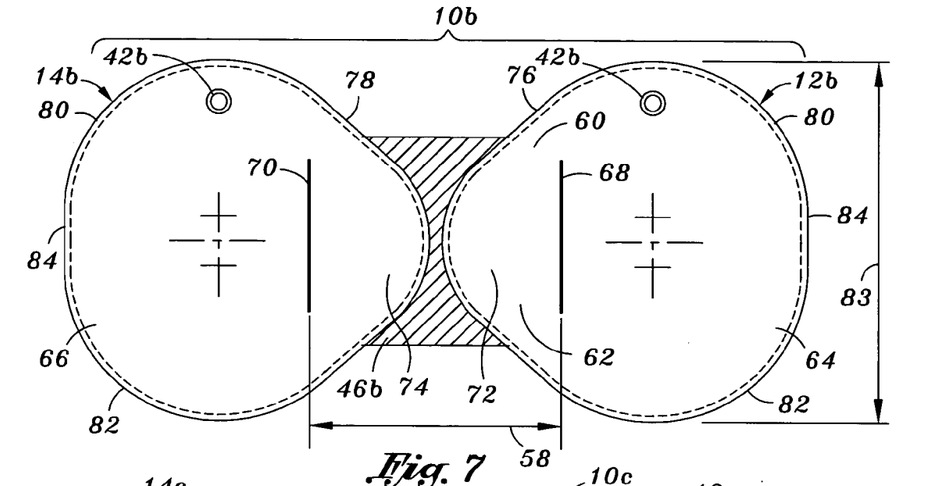
FIG. 7 is a front view of a second embodiment of the head rest.

In an alternate embodiment, referring now to FIG. 7, a head rest 10*b* having a first inflatable compartment 12*b* attached to a second inflatable compartment 14*b* is shown. The distance between the first inflatable compartment 12*b* and the second inflatable compartment 14*b* may be sized such that the first inflatable compartment 12*b* supports a left rear side of a person's head 16 and the second inflatable compartment 14*b* supports a right rear side of the person's head 16. In this manner, the person's head may remain supported, and preferably upright while sleeping in the seated position. The person may also inflate the first inflatable compartment 12*b* and the second inflatable compartment 14*b* independently of each other as the user finds comfortable.

The head rest 10*b* may be disposed between the person's head and an upper portion of a reclined seat. More particularly, the bottom of the head rest 10*b* may rest on the person shoulder's or be located above the shoulders, and the center of the head rest 10*b* may be aligned to the person's neck or the lower portion or base of a person's head. The first inflatable compartment 12*b* may apply a forward right force at the rear left base of the person's head, and the second inflatable compartment 14*b* may apply a forward left force at the rear right base of the person's head. The forward forces applied to the person's head via the first and second inflatable compartments 12*b*, 14*b* may help maintain the person's head away from the seat upper portion. The left and right forces may be equal to each other to stabilize the person's head in the middle of the first and second inflatable compartments 12*b*, 14*b* such that the person's head does not roll off of the head rest 12*b*.

The first and second inflatable compartments 12*b*, 14*b* may also form a channel (e.g., straight configuration 58 shown in FIG. 7, bowed configuration 86 shown in FIG. 8, etc.) to receive the person's neck or lower head portion in order to provide support for the cervix by maintaining the cervical curvature of the neck which is important for a healthy spine. FIG. 7 illustrates a channel 58 having a straight configuration. The channel 58, when the head rest 10*b* is inflated, proceeds from 60 to 62 between the outer portions 64, 66 of the first and second inflatable compartments 12*b*, 14*b*. To form the channel 58 having a straight configuration, the front layer (see FIG. 7) and the back layer 32 (not shown) which form the first and second inflatable compartments 12*b*, 14*b* may be sealed together with straight vertical lines 68, 70 at the inner portions 72, 74 of the first and second inflatable compartments 12*b*, 14*b*. The vertical straight seal lines 68, 70 may terminate prior to the outer peripheries 76, 78 of the first and second compartments 12*b*, 14*b* to form fluid communication channels such that the inner portions 72, 74 of the first and second compartments 12*b*, 14*b* may also be inflated when the first and second inflatable compartments 12*b*, 14*b* are inflated. The vertical straight seal lines 68, 70 may be about four (4) to about eight (8) inches apart from each other. Preferably, the vertical straight seal lines 68, 70 may be five inches (5 inches) apart from each other to accommodate an average sized person. Different dimensions can be used for different sized heads.

The first and second inflatable compartments 12*b*, 14*b* may have mirror configurations of each other. For example, the first and second inflatable compartments 12*b*, 14*b* may have a generally round silhouette. More particularly, the top and bottom portions 80, 82 of the first and second inflatable compartments 12*b*, 14*b* may be circular with a radius of about three and three quarter (3¾) inches; the inner portions 72, 74 of the first and second inflatable compartments 12*b*, 14*b* may have a rounded tip pointing inward toward each other which are separated from each other by approximately one quarter (¼) inch. It is also contemplated that the rounded tips are separated from each other up to about four and one quarter (4¼) inches. The sides 84 of the first and second inflatable compartments 12*b*, 14*b* may be straight for approximately 1.20 inches. The overall height 83 of the head rest 10*b* may be about six and three quarter (6¾) inches to about eight and three quarter (8¾) inches. Also, the head rest 10*b* may be about two (2) to about four (4) inches thick when inflated. The mirror configurations of the first and second inflatable compartments 12*b*, 14*b* create equalizing forces on the person's head 16 such that the head 16 remains upright when resting on the head rest 10*b*.

The first and second inflatable compartments 12*b*, 14*b* may be attached to each other via a connecting strap 46*b* which spaces the first and second inflatable compartments 12*b*, 14*b* from each other such that the first and second inflatable compartments 12*b*, 14*b* may be properly positioned on the left and right rear sides of the person's head 16 to properly support the person's head 16.

The first and second inflatable compartments 12*b*, 14*b* may each be inflated via a separate valve 42*b* associated with each compartment. These valves 42*b* allow a person to inflate the first and second compartments 12*b*, 14*b* by blowing air or filling a suitable filler material into the first and second inflatable compartments 12b, 14b. These valves 42b also allow a person to deflate the first and second compartments 12b, 14b by releasing the air or suitable filler material from the first and second inflatable compartments 12b, 14b. One valve 42b may be connected to each of the first and second inflatable compartments 12b, 14b such that the first and second inflatable compartments 12b, 14b may be independently inflated. The valves 42b are advantageously positioned such that they do not touch or interfere with the person's head or neck when the head rest 10b is inflated and in use. By way of example and not limitation, the valves 42b may be located on the top portions 80 of the first and second inflatable compartments 12b, 14b. More particularly, each valve 42b may be located approximately five and one quarter inch (5¼ inch) outward from the center of the head rest 10b and approximately one (1) inch from the top of the head rest 10b. It is also contemplated that the valves 42b may be positioned on the bottom portions 82 of the first and second inflatable compartments 12b, 14b. It is also contemplated that the valves 42b may be positioned on the front layer (see FIG. 7) or the back layer of the head rest 10b.

The first and second inflatable compartments 12b, 14b including the connecting strap 46b may be fabricated from a front layer and a back layer. The front layer and the back layers may be sealed to form compartments 12b, 14b and the connecting strap 46b. By way of example and not limitation, the front layer and the back layer may be sealable sheets sealed via heating methods and non-heating methods such as ultrasonic sealing, gluing, adhering and the like. The exterior of the sheets may be coated with suede or velour, flocked, coated PVC, moisture absorbent material, or the like to provide a comfortable interface between the head rest 10b and the person's head/skin.

A first sheet (i.e., front layer) may be larger in size than about eight and three quarter (8¾) inches by about seventeen and seven eighth (17⅞) inches. The first sheet may be stacked on top of a second sheet (i.e., back layer) having the same general dimensions. Prior to stacking the first sheet over the second sheet, two valves 42b may be attached to the first sheet at the general vicinity of the first and second compartments 12b, 14b. The first sheet may be sealed to the second sheet in the configuration of the outer periphery of the first and second inflatable compartments 12b, 14b. The vertical straight seal 68, 70 lines may also be formed. Also, the entire area of the connecting strap 46b may be sealed. Thereafter, the silhouette of the head rest 10b may be cut out as shown in FIG. 7.

The head rest 10b may be easily folded when deflated into a compact volume when a fluid such as gas or air is used as the filler material. The vertical straight seal lines 68, 70 may be used as fold lines to assist the user in folding the head rest 10b when not in use. The outer portions 64, 66 of the first and second inflatable compartments 12b, 14b may be folded at the vertical straight seal lines 68, 70 such that the head rest 10b is in a tri fold configuration.

Figure 8:
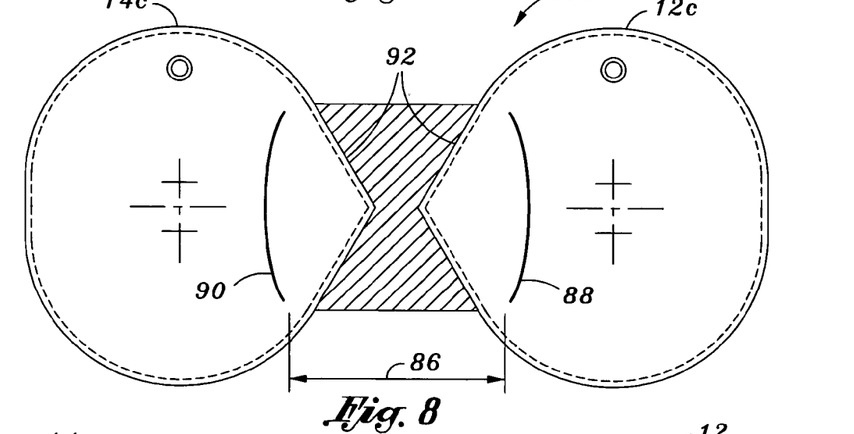
FIG. 8 is a front view of a third embodiment of the head rest.

In a further alternate embodiment, FIG. 8 illustrates a head rest 10c. The channel 86 of the head rest 10c may have a bowed configuration on the ends which is in contrast to the straight configuration on the ends of the channel 58 shown in FIG. 7. To form the bowed configuration of the channel 86, the vertical straight seals 68, 70 shown in FIG. 7 are replaced with concave curved seals 88, 90 which point inward toward the center of the head rest 10c. The first and second inflatable compartments 12c, 14c may also be sized and configured to receive the base of the person's head. In particular, the first and second inflatable compartments 12c, 14c may form a cradle 92 having about a sixty degree angle, and the tips (e.g., pointed or rounded) of the inner portions may be about one (1) inch apart from each other.

The head rests 10b (see FIG. 7) and 10c (see FIG. 8) were discussed above as being positioned such that the channels 58 and 86 are positioned about the person's neck. It is also contemplated that the head rests 10b and 10c be sufficiently high to support the head when the bottom of the head rest 10b and 10c rests on the person's shoulders. It is also contemplated that the approximate center of the head rests 10b, 10c may be positioned to be level or centered to the person's ears and eyes. In this manner, the channels 58 and 86 receive the rear center portion of the person's head instead of the person's neck. In relation to head rest 10c (see FIG. 8), the channel 86 has a bowed configuration which corresponds to the curved configuration of the person's head to provide a comfortable interface between the head rest 10c and the person's head.

Figure 9:
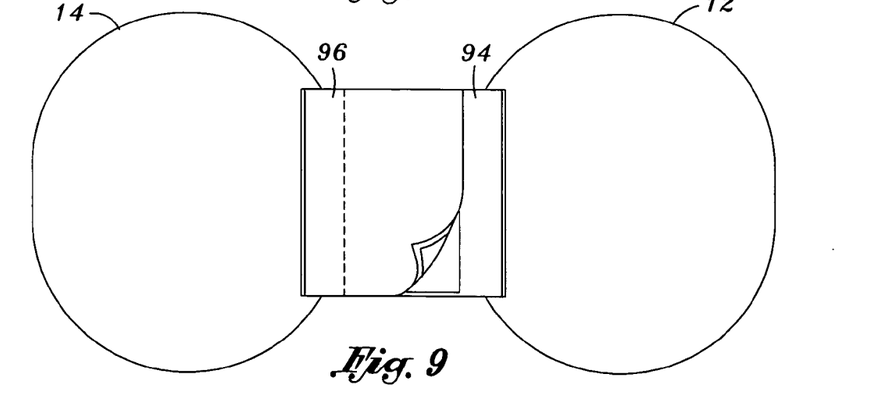
FIG. 9 is a front view of a head rest illustrating a method of adjusting the distance between the first and second inflatable compartments.

FIG. 9 illustrates a method of adjusting the distance between the first and second inflatable compartments 12, 14. This method may be employed in adjusting the distances between the first and second inflatable compartments 12, 14 for the head rest 10 wherein the first inflatable compartment 12 is isolated from the second inflatable compartment 14. The reason for making the compartments 12, 14 adjustable is that, on the one hand, if the first and second inflatable compartments 12, 14 are separated too far apart then the person's head 16 may touch the seat upper portion or may be too loosely supported between the first and second inflatable compartments 12, 14. On the other hand, if the first and second inflatable compartments 12, 14 are too close together then the person's head 16 may be forced away from the seat into an uncomfortable position. Accordingly, it is preferable that the distance between the first and second inflatable compartments 12, 14 be adjustable according to the size of the person's head 16 such that the person's head fits and is comfortably supported therebetween. Generally, the distance between the first and second inflatable compartments 12, 14 should be enlarged for larger head sizes and reduced for smaller head sizes to optimally fit the person's head 16.

In FIG. 9, the first inflatable compartment 12 may be attached to a first connector 94. The first connector 94 may be a flat flexible material such as fabric or vinyl. A topside of the first connector 94 may be lined with a set of loops of the type used on hook and loop fasteners. The second inflatable compartment 14 may be attached to a second connector 96. The second connector 96 may be a flat flexible material such as fabric or vinyl. An underside of the second connector 96 may be lined with a set of hooks of the type used on hook and loop fasteners. The sets of hooks and loops may extend across the entire underside of the second connector 96 and the entire topside of the first connector 94, respectively. In this manner, the first connector 94 may be removed and repositioned on the second connector 96 via the hooks and loops to adjust the distance between the first and second inflatable compartments 12, 14. It is also contemplated that the hooks and loops may be replaced with a plurality of snaps, buttons, buckles, toggles or other releasable fasteners.

Figure 10:
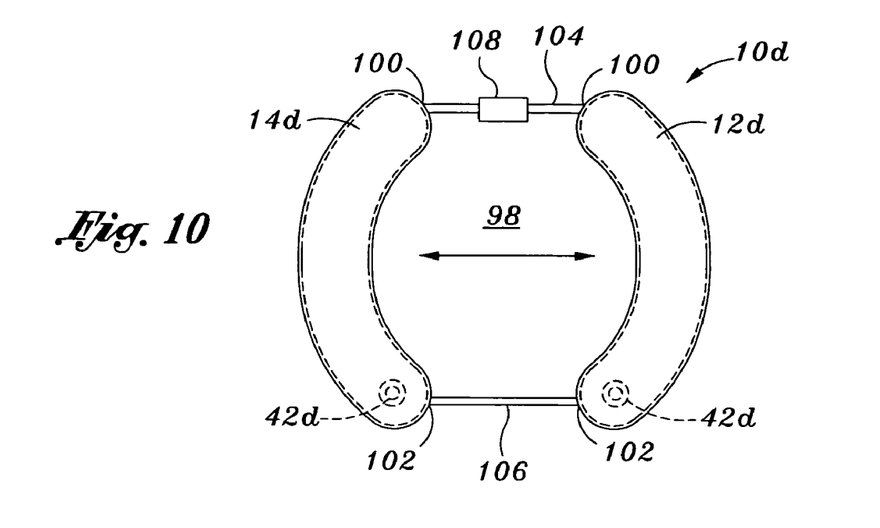
FIG. 10 is a fourth embodiment of the head rest illustrating first and second inflatable compartments having banana shaped configurations.

In an alternate embodiment, FIG. 10 illustrates a head rest 10d. The head rest 10d has a first inflatable compartment 12d and a second inflatable compartment 14d which each have a banana shaped configuration. The first inflatable compartment 12d and the second inflatable compartment 14d may be directed toward each other to provide an oval or football shaped cavity 98 when the first inflatable compartment 12*d* and the second inflatable compartments 14*d* are inflated. The shaped cavity 98 may be configured to receive the rear center portion of the person's head 16. The top and bottom distal ends 100, 102 of the first and second inflatable compartments 12*d*, 14*d* may be attached to an upper member or cord 104 and a lower member or cord 106, respectively. The upper cord 104 may be attached to the top distal ends 100 of the first and second inflatable compartments 12*d*, 14*d*, and the lower cord 106 may be attached to the bottom distal ends 102 of the first and second inflatable compartments 12*d*, 14*d*. The length of the upper and lower cords 104, 106 may space the first and second inflatable compartments 12*d*, 14*d* apart from each other such that the rear of the person's head may be cradled within the football shaped cavity 98. Additionally, the length of the upper cord 104 may be adjustable via adjustment mechanism 108 to bring the first and second inflatable compartments 12*d*, 14*d* closer together or further apart depending on the size of the person's head 16. Various adjustment mechanisms can be used, including tying the members 104, buckles, or other adjustable length fasteners. An elastic member 104 could also be used. One valve 42*d* may be attached to each of the first and second inflatable compartments 12*d*, 14*d* at the lower outer periphery of the compartments 12*d* and 14*d*.

Figure 11:
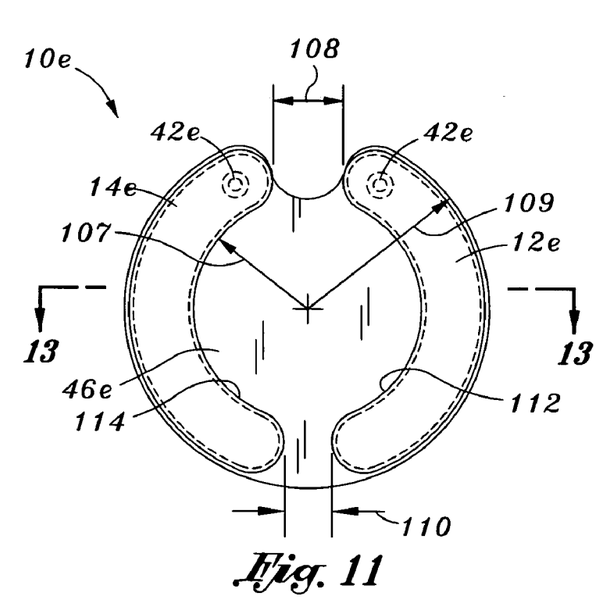
FIG. 11 is a fifth embodiment of the head rest illustrating first and second inflatable compartments having a semi-circular configuration.

In an alternate embodiment, FIG. 11 illustrates a head rest 10*e*. The head rest 10*e* may have a first inflatable compartment 12*e* and a second inflatable compartment 14*e* isolated from each other. The first and second inflatable compartments 12*e*, 14*e* may each have a semi-circular configuration with an inner radius 107 of approximately two (2) inches and an outer radius 109 of approximately four (4) inches. The central area need not be circular, and it is also contemplated that the first and second inflatable compartments 12*e*, 14*e* may have a banana shape configuration, as shown in FIG. 10. The tops of the first and second inflatable compartments 12*e*, 14*e* may be approximately three (3) inches apart from each other, as shown by 108, and the bottoms of the first and second inflatable compartments 12*e*, 14*e* may be approximately two (2) inches apart from each other, as shown by 110. One valve 42*e* may be attached to each of the first and second inflatable compartments 12*e*, 14*e* at the lower outer periphery of the first and second inflatable compartments 12*e*, 14*e*.

Figure 12:
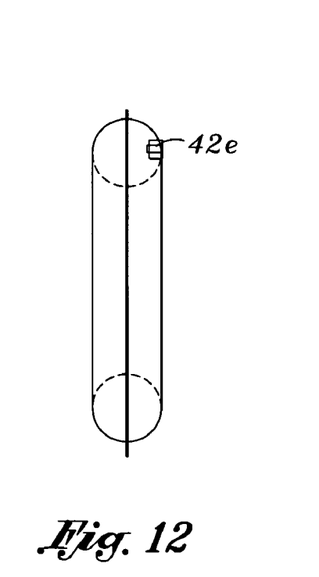
FIG. 12 is a side view of the head rest illustrated in FIG. 11.
Figure 13:
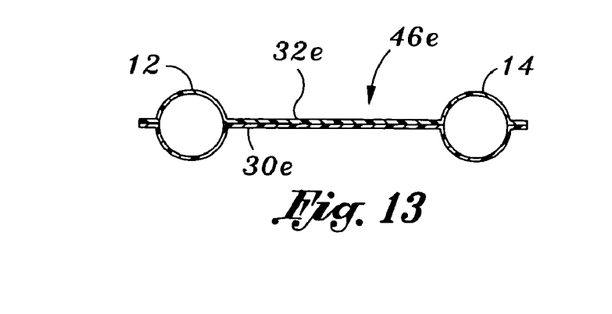
FIG. 13 is a cross sectional view of the head rest illustrated in FIG. 11.

The first inflatable compartment 12*e*, the second inflatable compartment 14*e*, and the connecting strap 46*e* may be fabricated from two sealable sheets forming a front layer 30*e* and a back layer 32*e* (see FIG. 13). By way of example and not limitation, the sealable sheets may be plastic sheets sealed via heating methods and non-heating methods such as ultrasonic sealing, gluing, adhering and the like. The sheets may be about five (5) inches square. The sheets may be stacked on top of each other. The peripheries 112, 114 of the first and second inflatable compartments 12*e*, 14*e* may be sealed into the sheets, as shown by the solid lines in FIG. 11. The connecting strap 46*e* defined by the inner radius 107 of the first and second inflatable compartments 12*e*, 14*e* may be entirely sealed to each other to form a planar membrane, or various sized and shaped openings can be formed in the strap 46*e*. Thereafter, the head rest silhouette may be cut out of the sheets. As shown in FIGS. 12 and 13, the compartments 12, 14 when inflated may form a circular cross section. The compartments 12*d*, 14*d* support the sides of a person's head while the connecting strap 46*e* joins the compartments and engages a portion of a person's head or neck.

Figure 14:
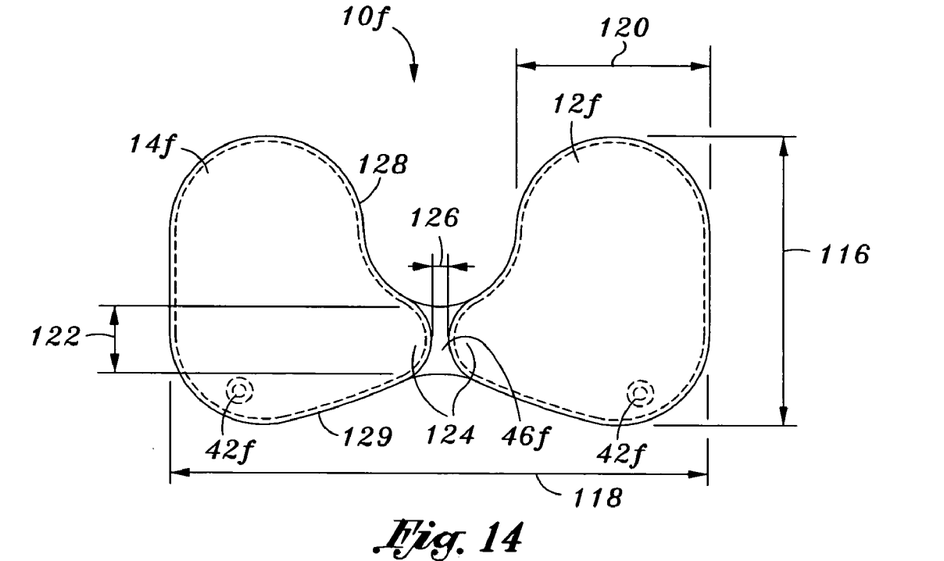
FIG. 14 is a sixth embodiment of the head rest illustrating a curved inner periphery and a sloping lower periphery of the head rest.

In an alternate embodiment, FIG. 14 illustrates a head rest 10*f*. The head rest 10*f* may have a first inflatable compartment 12*f* and a second inflatable compartment 14*f* which are isolated from each other such that they may be independently inflatable. The compartments 12*f*, 14*f* may be connected to each other via connecting strap 46*f*. When deflated the overall dimensions of the head rest 10*f* may be about ten (10) inches in height 116 and about fifteen (15) inches in width 118. The first inflatable compartment 12*f* may have a reverse L shaped configuration, and the second inflatable compartment 14*f* may have an L shaped configuration. The width 120 of the vertical portions of the first and second inflatable compartments 12*f*, 14*f* may be about five and one half (5½) inches wide. The width 122 of the horizontal portions of the first and second inflatable compartments 12*f*, 14*f* may be narrower compared to the width 120 of the vertical portions. Distal ends 124 of the horizontal portions may be curved and separated from each other about one half (½) inch 126.

The compartments 12*f*, 14*f* each have a generally L shaped configuration with the lower leg of the L shape fitting adjacent a person's neck during use. An upper periphery 128 of the head rest 10*f* may have a curved U shaped configuration to receive the rear lower portion of the person's head 16. The vertical portions of the compartments 12*f*, 14*f* may be placed against the seat upper portion such that the person's head may be cradled therebetween. A lower periphery 129 of the head rest 10*f* may have a sloping concave configuration which may rest on the person's upper shoulders to vertically position the head rest 10*f* with respect to the person's head 16. The sloping concave configuration also adds support to the back of the person's neck. Valves 42*f* may be formed at the bottom of the first and second inflatable compartments 12*f*, 14*f* such that valves 42*f* do not touch the person's skin when the head rest 10*f* is in use.

Figure 15:
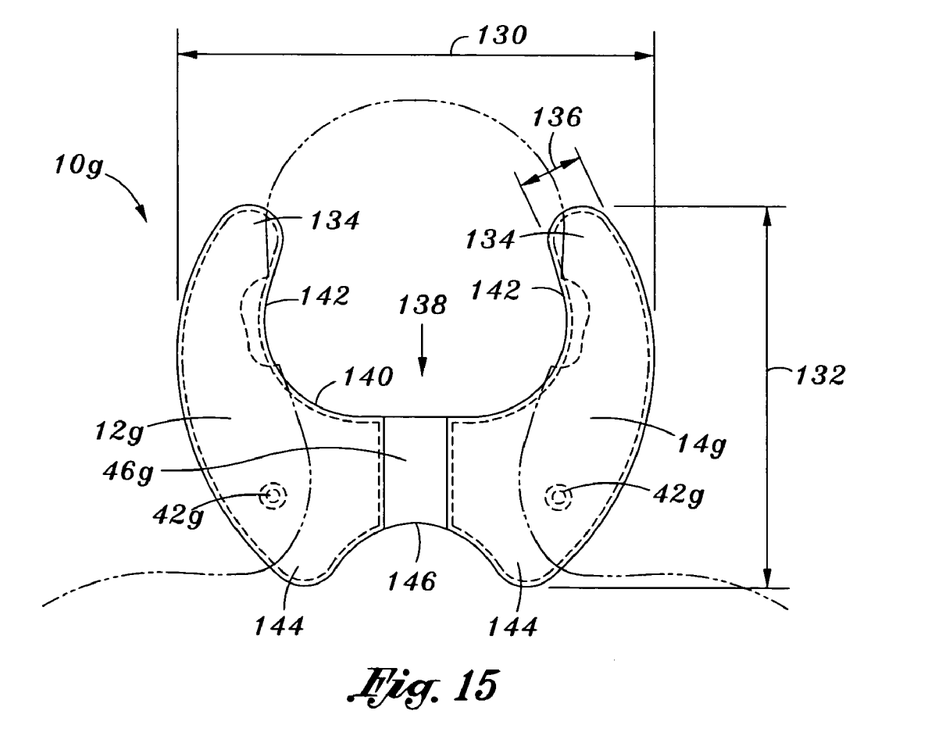
FIG. 15 is a seventh embodiment of the head rest illustrating vertical portions of first and second inflatable compartments curved inward such that tops thereof support the rear upper sides of the person's head.

In a further alternate embodiment, FIG. 15 illustrates a head rest 10*g*. The head rest 10*g* may have first and second inflatable compartments 12*g*, 14*g* which are isolated from each other such that they may be independently inflatable. When deflated the overall dimensions of the head rest 10*g* may be about thirteen (13) inches wide 130 by about twelve (12) inches high 132 for an average person, but the size will vary. The first inflatable compartment 12*g* may have an L shaped or wing shaped configuration with the juncture of the two legs of the L projecting downward and the vertical leg of the L being curved. The second inflatable compartment 14*g* may have a mirror image L shaped configuration. The tops 134 of the vertical portions of the first and second inflatable compartments 12*g*, 14*g* may be about three and one half (3½) inches wide 136 when deflated. The vertical portions may curve inward such that the tops 134 of the vertical portions point toward the center of the head rest 10*g* and rest against the rear upper sides of the person's head when in use. The upper periphery 138 of the head rest 10*g* may have a straight bottom 140 and curved sides 142. The bases 144 of the first and second inflatable compartments 12*g*, 14*g* may extend past the connecting strap 46*g* wherein its lower periphery 146 is sized and configured to receive the person's neck and/or upper shoulders. For example, as shown in FIG. 15, the lower periphery 146 may be arched to fit the person's upper shoulder and neck, or the periphery 146 could engage the back of the person's head. One valve 42*g* may be formed on each of the first and second inflatable compartments 12*g*, 14*g* for inflating and deflating the first and second inflatable compartments 12*g*, 14*g*. Again, the valves are preferably located so they do not contact the person during use of the head rest 10*g*.

Figure 16:
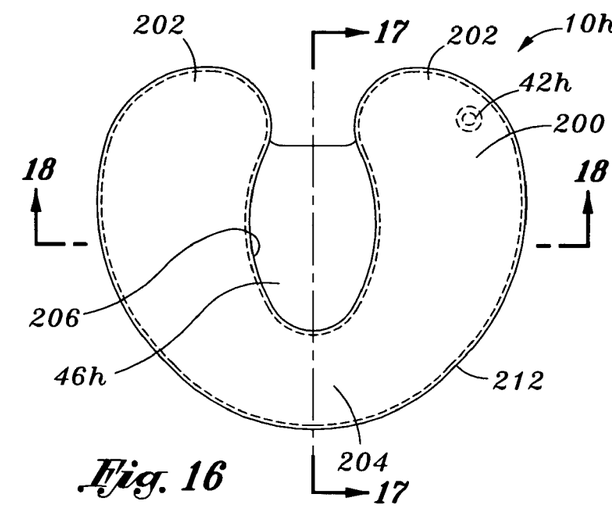
FIG. 16 is an eight embodiment of the head rest illustrating a U shaped inflatable compartment.
Figure 17:
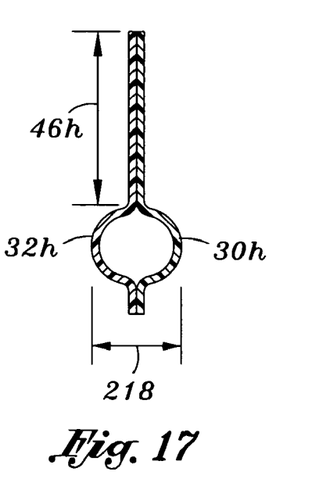
FIG. 17 is a vertical cross sectional view of the head rest shown in FIG. 16.
Figure 18:
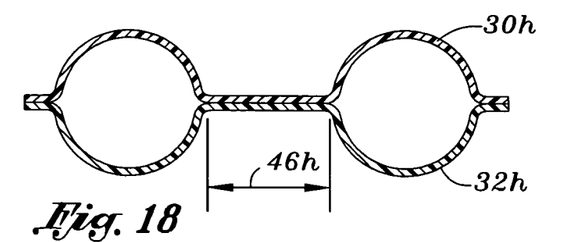
FIG. 18 is a horizontal cross sectional view of the head rest shown in FIG. 16.

In a further alternate embodiment, FIGS. 16–18 illustrate a head rest 10*h*. The head rest 10*h* may have a single inflatable compartment 200 which may be inflated via valve 42h. The head rest 10h may have a generally U shaped configuration. The tops 202 of the inflatable compartment 200 may have an enlarged configuration compared to the bottom 204 of the inflatable compartment. The tops 202 may be disposed between the person's head and the seat upper portion, and the bottom 204 may be disposed between the person's neck and the seat upper portion to vertically stabilize the person's head. An inner periphery 206 of the inflatable compartment 200 may be joined to each other via the connecting strap 46h to maintain the spatial relationship of the inflatable compartment 200 when the head rest 10h is in use. The person's head may be cradled between the vertical portions of the U shaped compartment 200, and more particularly, at the periphery 206 thereof. FIG. 17 illustrates the diameter of the bottom 204 of the head rest 10h. Also, FIG. 18 illustrates the diameter of the tops 202 of the head rest 10h.

The head rest 10h may be fabricated by sealing a front layer 30h to a back layer 32h. The front layer 30h may be sealed to the back layer 32h along the inner periphery 206 and an outer periphery 212 of the head rest 10h. Further, the front layer 30h and the back layer 32h may be sealed together at connecting strap 46h.

Figure 19:
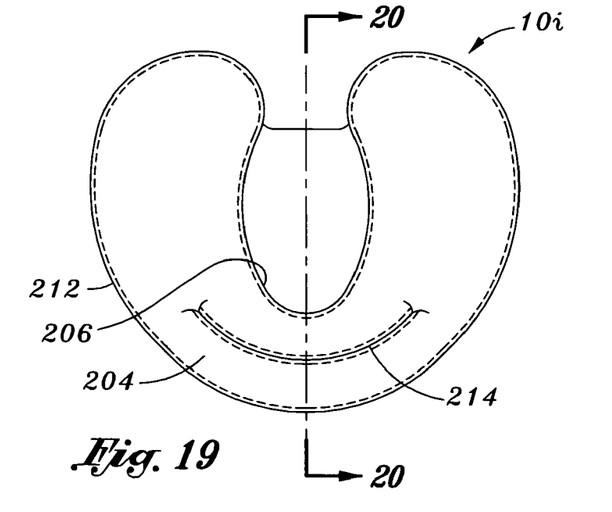
FIG. 19 is an alternate embodiment of the head rest shown in FIG. 16 illustrating an extra seal line along the bottom of the inflatable compartment.
Figure 20:
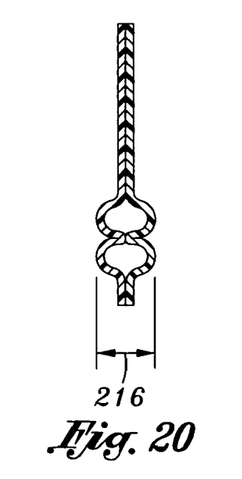
FIG. 20 is a cross sectional view of the head rest shown in FIG. 19.

FIGS. 19 and 20 illustrate a head rest 10i which is an alternate embodiment of the head rest 10h shown in FIGS. 16–18. In particular, the head rest 10i may be fabricated by forming an extra seal line 214 at the bottom 204 of the head rest 10i. The seal line 214 may follow the inner and outer peripheries 206, 212 of the compartment 200 at about the middle therebetween, or it may be shaped differently or located away from the middle to vary the sizes of the compartments on opposing sides of the seal line in order to provide a desired support in the neck area of the user. The depicted embodiment has two equally sized, tubular compartments extending along the neck area and joining the adjacent side compartments. The head rest 10i forms a thinner profile 216 at the bottom 204 of head rest 10i compared to the profile 218 of the bottom 204 of head rest 10h, as shown by contrasting FIGS. 17 and 20.

An advantage of the head rest 10 discussed above having a first inflatable compartment 12 which is isolated from a second inflatable compartment 14 is that the person's head does not roll off of the first and/or second inflatable compartments 12, 14 when such compartments 12, 14 are not fully inflated. The reason is that the filler material filled in the first inflatable compartment 12 does not transfer into the second inflatable compartment 14 when person's head rests against the first inflatable compartment 12. Similarly, the filler material filled in the second inflatable compartment 14 does not transfer into the first inflatable compartment 12 when the person's head rolls onto the second inflatable compartment 14. Accordingly, the person's head may be stabilized and supported between the first and second inflatable compartments 12, 14 even if the first and second inflatable compartments 12, 14 are not fully inflated or are only partially inflated.

As stated above, the distance between the first inflatable compartment 12 and the second inflatable compartment 14 may preferably, but optionally, be adjusted via the connecting strap 46 shown in FIGS. 9 and 10. The purpose of adjusting the distance between the first and second inflatable compartments 12, 14 was to fit the head rest 10 to the size of the person's head. Alternatively, the head rest 10 may be adjusted to the size of the person's head by inflating or deflating the first and second inflatable compartments 12, 14 to an extent such that the head rest 10 is properly fitted to the person's head. Further, since the filler material within the first and second inflatable compartments 12, 14 are not transferred between each other when the person's head rolls onto the first or second inflatable compartments 12, 14, as stated above, the person's head is still vertically supported even though the first and second inflatable compartments 12, 14 are only partially inflated.

The compartments 12, 14 thus advantageously provided first and second means for supporting a person's head when seated. The upper portion of the compartments 12, 14 provide means for supporting a person's head, while the lower portions of the compartments 12, 14 provide means for supporting a person's neck and/or for supporting the base of a person's head or skull. The various forms of the strap 46 provide means for joining the first and second means, and also provide means for joining the first and second means a distance apart to accommodate a user's head.

In a further aspect the head rest 10 may be positioned at about the lower back of the person for providing back support while in the seated position. To this end, the head rest 10 may be partially inflated and the first and second inflatable compartments 12, 14 may be adjusted (if adjustable) as close together. The first and second inflatable compartments 12, 14 may be placed on the left and right sides, respectively, of the person's spine near the lower back.

In another aspect of the head rest 10, the person may position the head rest 10 between his/her knees and calves for providing an exercise to stimulate blood flow. To this end, the person may squeeze the head rest 10 positioned between the knees and calves by applying compressive pressure to the head rest 10 with their legs then relaxing. The person may repeat applying pressure to the head rest 10 then relaxing for ten (10) to fifteen (15) repetitions. This exercise may be performed during travel on an airplane, bus, train, etc.

The above description is given by way of example, and not limitation. Given the above disclosure, one skilled in the art could devise variations that are within the scope and spirit of the invention disclosed herein, including various ways of forming the first and second inflatable compartments 12, 14. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A head rest for supporting a person's head while in a seated position in a seat having a back adjacent the seated person's head, the person's head defining left and right sides, the head rest comprising:
a first inflatable compartment sized and configured to receive the left side of the person's head;
a second inflatable compartment sized and configured to receive the right side of the person's head having a substantially mirror configuration of the first inflatable compartment, the first inflatable compartment being isolated from the second inflatable compartment such that the first and second inflatable compartments are independently inflatable;
a connecting strap attached to the first and second inflatable compartments and having a length to place the first and second inflatable compartments adjacent a person's head when the head rest supports the person's head; and first and second valves attached to first and second inflatable compartments, respectively, for filling and removing a filler material from the first and second inflatable compartments;

wherein the first and second inflatable compartments each have ear recesses for receiving ears of the person such that the first and second inflatable compartments support sides of the person's head.

2. The head rest of claim 1 wherein the first and second inflatable compartments are air tight and inflatable with a fluid.

3. The head rest of claim 1 wherein the filler material is cotton, beads, gel, foam, fluid, liquids, gases, air, carbon dioxide, or a soft plush material.

4. The head rest of claim 1 wherein each of the first and second inflatable compartments comprise a front layer and a back layer sealed with an oval shaped seal line.

5. The head rest of claim 1 wherein the connecting strap comprises the inflated compartment and is inflatable via a third valve attached to the connecting strap.

6. The head rest of claim 1 wherein the connecting strap comprises:
- a first connector attached to the first inflatable compartment, a top side of the first connector having a first portion of a releasable fastener attached thereto; and
- a second connector attached to the second inflatable compartment, an underside of the second connector having a second portion of a releasable fastener attached thereto selected to releasably engage the first portion;
- wherein the first portion is removeably securable to the second portion for adjusting the distance between the first and second inflatable compartments.

7. The head rest of claim 6 wherein the first portion is a set of loops and the second portion is a set of hooks.

8. The head rest of claim 1 further comprising an inflated compartment between the back of the person's head and the seat during use and integrally joined with the first and second inflatable compartments.

9. A head rest for supporting a person's head while in a seated position in a seat having a back adjacent the seated person's head, the person's head defining left and right sides, the head rest comprising:
- a first inflatable compartment sized and configured to receive the left side of the person's head;
- a second inflatable compartment sized and configured to receive the right side of the person's head having a substantially mirror configuration of the first inflatable compartment, the first inflatable compartment being isolated from the second inflatable compartment such that the first and second inflatable compartments are independently inflatable;
- a connecting strap attached to the first and second inflatable compartments and having a length to place the first and second inflatable compartments adjacent a person's head when the head rest supports the person's; and
- first and second valves attached to first and second inflatable compartments, respectively, for filling and removing a filler material from the first and second inflatable compartments; and wherein, and wherein the first and second inflatable compartments each have ear recesses for receiving ears of the person such that the first and second inflatable compartments support sides of the person's head.

10. The head rest of claim 9 wherein each of the first and second inflatable compartments comprise a front layer and a back layer sealed with an oval shaped seal line.

11. The head rest of claim 9 wherein the connecting strap is inflatable via a third valve attached to the connecting strap.

* * * * *